United States Patent [19]

Shoh

[11] 3,955,740

[45] May 11, 1976

[54] VIBRATORY SEAM WELDING APPARATUS
[75] Inventor: Andrew Shoh, Ridgefield, Conn.
[73] Assignee: Branson Ultrasonics Corporation, New Canaan, Conn.
[22] Filed: June 9, 1975
[21] Appl. No.: 584,777

[52] U.S. Cl. .................................. 228/1; 228/110
[51] Int. Cl.² .......................................... B23K 1/06
[58] Field of Search .............. 228/1, 110, 111, 115; 51/59 SS

[56] References Cited
UNITED STATES PATENTS
3,471,724  10/1969  Balamuth .......................... 51/59 SS OTHER PUBLICATIONS
"Basic Vibrations", Metalworking Production, Vol. 106, No. 33, Aug. 15, 1962.

Primary Examiner—Al Lawrence Smith
Assistant Examiner—Margaret Joyce
Attorney, Agent, or Firm—Ervin B. Steinberg; Philip J. Feig

[57] ABSTRACT

This invention refers to a novel arrangement for mounting a vibratory assembly concentrically within a cylindrical housing for use in a vibratory seam welding apparatus. A pair of metal diaphragms support the vibratory assembly at antinodal regions of motion along the longitudinal axis. These diaphragms are constructed for supporting the assembly within the housing and for providing acoustic energy isolation between the vibratory assembly and the housing while being yieldable in the direction of the vibratory motion along the axis of the assembly.

6 Claims, 4 Drawing Figures

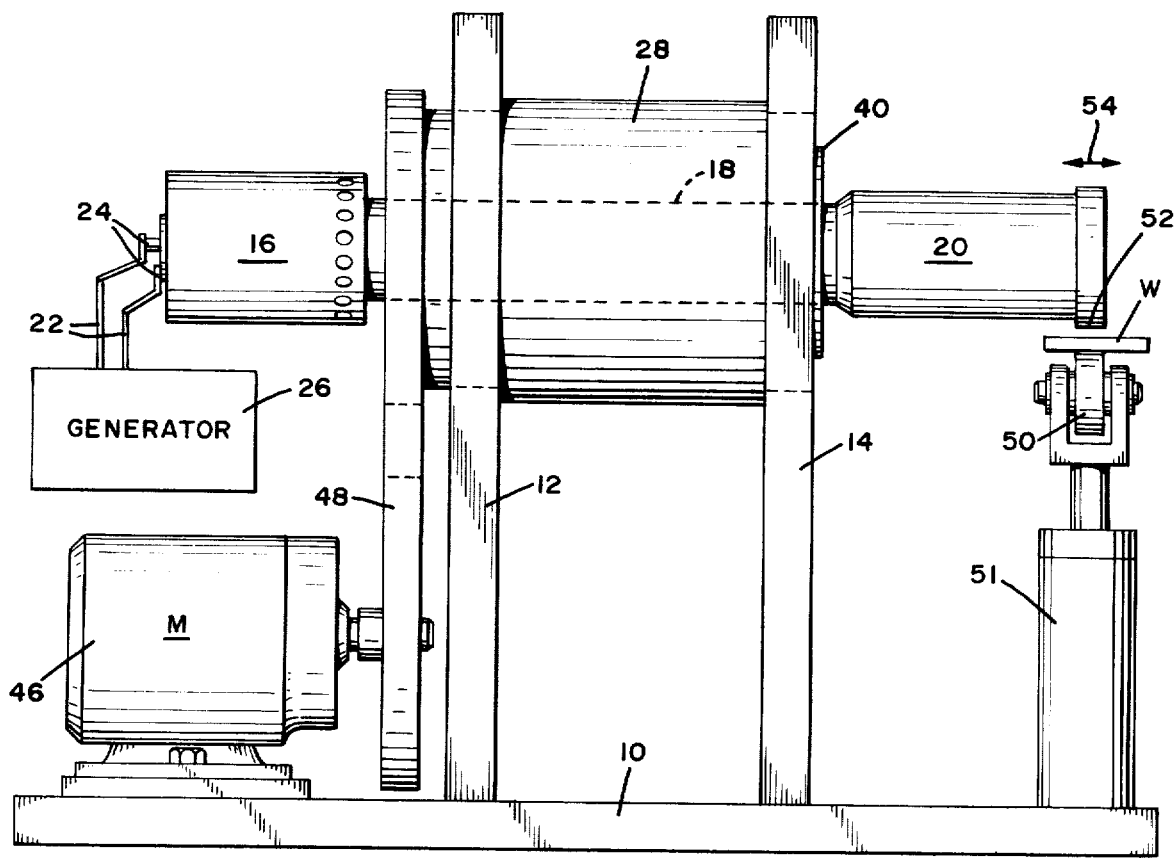
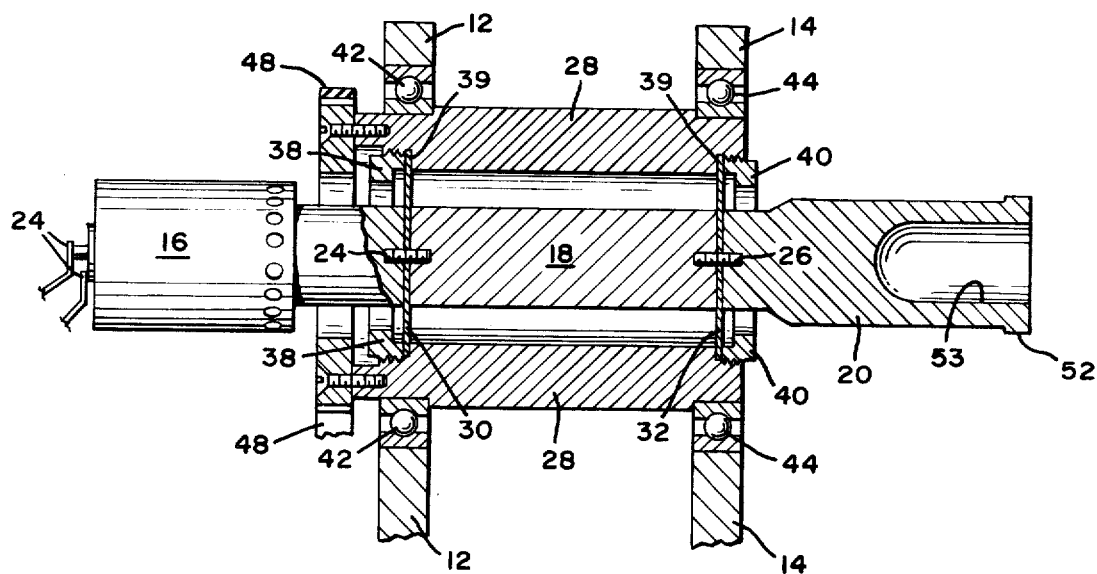

VIBRATORY SEAM WELDING APPARATUS

SUMMARY OF THE INVENTION

The present invention refers to a vibratory seam welding apparatus and more specifically has reference to a sonic or ultrasonic seam welding apparatus wherein the workpiece engaging surface rotates with respect to a workpiece. Quite specifically, the invention concerns a novel arrangement for mounting a vibratory assembly concentrically within a cylindrical housing. The workpieces to be welded are thin solid or fibrous plastic material or metallic sheets or foils.

Vibratory seam welding at a sonic or ultrasonic frequency in the range between 500 Hz and 100 kHz is well known. A vibratory welding system basically comprises an electrical generating means, an electroacoustic converter for converting electrical energy to vibratory energy, a tool for delivering the vibratory energy into the weld zone and an appropriate means for applying a static force to the workpieces so as to hold the latter in forced contact with the tool. A typical welding apparatus of the prior art is disclosed in U.S. Pat. No. 2,946,120 by J. B. Jones et al, dated July 26, 1960, entitled "Seam Vibratory Welding Apparatus and Method".

The vibratory welding apparatus is most suitable for operating in the sonic or ultrasonic frequency range, that is, a frequency in the range between 1 and 100 kHz. The half wavelength resonator (also known as a horn, tool, or concentrator) is dimensioned to vibrate at its predetermined frequency. When the resonator is rendered resonant it undergoes expansion and contraction along its longitudinal axis. A workpiece engaging surface is disposed at one end of the resonator which end is located at an antinodal region of the longitudinal motion. The other end of the resonator, also located at an antinodal region of motion, is coupled to either the electroacoustic converter or to an intermediate coupling member for receiving vibratory energy. The vibratory assembly comprising a converter, the intermediate coupling member and the half wave-length resonator is concentrically coupled by diaphragms to a cylindrical housing at antinodal regions of motion along the longitudinal axis of the assembly.

In prior vibratory seam welding apparatus, the vibratory assembly has been coupled to the cylindrical housing at nodal regions of vibratory motion along the longitudinal axis of the vibratory assembly. The coupling members were generally constructed of neoprene or other similar resilient material which while providing acoustic isolation between the vibratory assembly and the housing underwent deformation resulting in misalignment of the vibratory assembly, see, for instance, U.S. Pat. No. 3,292,838, dated Dec. 20, 1966 by V. P. Farley. In alternative prior art apparatus, resilient O rings have been used to acoustically isolate the housing. The O rings while providing acoustic decoupling do not provide a rigid support for the vibratory assembly resulting in misalignment responsive to the application of a force normal to the transducer axis, which force is necessary to accomplish seam welding. A further alternative mounting embodiment comprises the Elmore arrangement as shown in U.S. Pat. Nos. 2,891,178, 2,891,179, and 2,891,180. In these constructions the resonator in engaged by metallic means at nodal zones of motion followed by a one-quarter wavelength tuned section for decoupling the vibrations from the stationary mounting structure. This mounting structure is relatively expensive and bulky aside from the requirement that the one-quarter wavelength section must be precisely machined and tuned. It will be apparent that the prior art devices described do not provide as stable, rigid, accurate or economical alignment of the vibratory assembly within the cylindrical housing as that accomplished by the present invention.

The coupling of the ultrasonic assembly to the cylindrical housing in the present invention is accomplished by a pair of appertured diaphragms disposed at the antinodal regions of vibratory motion along the resonator. The inner diameter of the diaphragms is dimensioned to be less than the circumference of the resonator and the outer diameter is dimensioned to fit within the cylindrical housing. The diaphragms are clamped between adjacent sections of the vibratory assembly. A first diaphragm is clamped between the electroacoustic converter and a first end of the coupler while a second diaphragm is clamped between the resonator and the other end of the coupler. Since the motion at the antinodal regions is substantially axial having only a negligible radial component of motion, the diaphragms are sufficient for ensuring that the vibratory assembly is decoupled from the housing without the use of O rings or other non-rigid or unstable material. The diaphragms are designed to be yieldable in the direction of the vibratory motion along the axis of the assembly, but to be rigid in the direction perpendicular to the motion, i.e., radially. Each diaphragm is constructed of an acoustically suitable material, typically titanium, aluminum or steel. A drive means couples the cylindrical housing to a motor for rotating the ultrasonic assembly during welding. Bearings are provided between the cylindrical housing and a support to ensure smooth rotation of the transducer assembly.

A principal object of the present invention is, therefore, the provision of a novel mounting arrangement for concentrically mounting a half wavelength resonant assembly within a cylindrical housing in a vibratory seam welding apparatus.

Another object of the invention is the provision of means for mounting a vibratory assembly at antinodal regions of vibratory motion along the longitudinal axis within a housing in a rotating vibratory seam welding apparatus.

A further object of the invention is the provision of diaphragms for acoustically decoupling and mounting a vibratory assembly within a housing.

Further and other objects of the present invention will be more clearly apparent by reference to the following description when read in conjunction with the accompanying drawings.

BRIEF DESCRIPTION OF THE DRAWINGS

FIG. 1 is an elevational view of a preferred embodiment of the seam welding apparatus;

FIG. 2 is an elevational view, partially in section of the seam welding apparatus per FIG. 1;

DETAILED DESCRIPTION OF THE INVENTION

Figure 3:
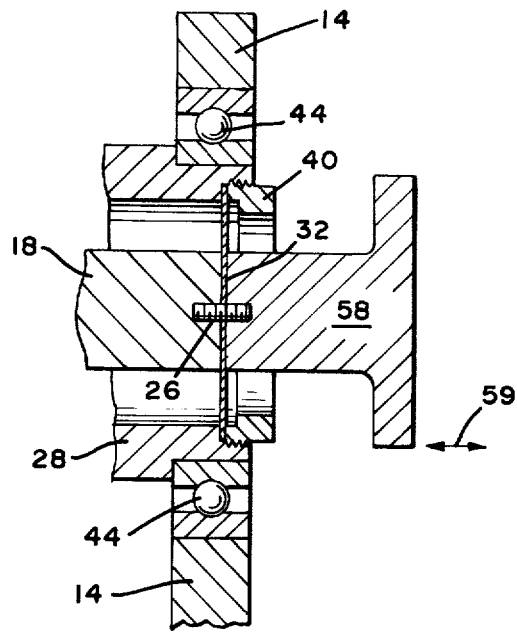
FIG. 3 is a sectional view of an alternative embodiment of a resonator for use in the present apparatus.

Referring to the figures and FIG. 1 in particular there is shown a vibratory seam welding apparatus forming the present invention. A stationary support 10 comprises two upstanding members 12 and 14 for supporting a rotatable vibratory assembly. The vibratory assembly comprises an electroacoustic converter 16, a coupling member 18 and a horn 20, the latter being known also as a tool, resonator concentrator or mechanical motion amplifier. While the coupling member 18 and the horn 20 are separate sections, it will be apparent to those skilled in the art that the coupling member may be an integral portion of the horn 20. The converter 16 is electrically coupled via a cable 22 and brushes 24 engaging slip rings to an electrical generator 26 which, when providing electrical energy of predetermined frequency, causes the converter 16 to transform the applied electrical energy to mechanical vibrations for rendering the vibratory assembly resonant along its longitudinal axis. The assembly is designed to be resonant at a predetermined frequency, typically a frequency in the range between 1 and 100 kHz. A converter suitable for use in the seam welding apparatus is disclosed in U.S. Pat. No. 3,328,610, dates June 27, 1967, issued to S. E. Jacke.

The vibratory assembly, as best seen in FIG. 2, is coupled to a cylindrical housing 28 by a pair of metallic diaphragms 30 and 32 disposed at antinodal regions of motion along the longitudinal axis of the vibratory assembly. The inner diameter of the diaphrams is dimensioned to be smaller than the circumference of the resonator and the outer diameter is dimensioned to fit into a radial recess 39 within the cylindrical housing 28. In this manner the diaphragms are clamped between the coupled half wavelength sections. The diaphragms 30 and 32 are dimensioned to be compliant at the predetermined resonant frequency in a direction along the axis of the longitudinal motion but are rigid in a direction perpendicular to such motion. The vibratory assembly, therefore maintains its proper alignment, disposed concentrically within the cylindrical housing 28. Moreover, the diaphragms 30, 32 are fabricated from a material exhibiting proper acoustic characteristics. The diaphragms must be capable of withstanding stress due to flexing at an ultrasonic frequency, exhibit long fatigue life and have low hysteresis loss at the displacement amplitude of interest. The thinness and the span of the unsupported area of the diaphragm are selected for allowing the diaphragm to flex at an ultrasonic rate and amplitude sufficient for decoupling the vibratory energy from the housing.

The diaphragms 30 and 32 are clamped between resonant half wavelength sections by means of threaded studs 24 and 26 which couple the coupler 18 to the converter 16 and to the horn 20. The periphery of each diaphragm 30 and 32 is clamped to the cylindrical housing by a respective threaded ring 38 and 40. The motion of the vibratory assembly at the antinodal regions is substantially along the longitudinal axis of the resonator. The diaphragms located at antinodal regions of longitudinal motion, therefore, provide acoustic isolation between the vibratory assembly and the cylindrical housing 28 while retaining the assembly in its proper central position.

The size of the unsupported portion of the diaphragms 30 and 32 is selected for providing minimal resistance to the vibratory motion in the axial direction at the resonant frequency.

Antifriction bearings 42 and 44 are secured between the cylindrical housing 28 and the upstanding members 12 and 14 in a known manner for providing continuous and smooth rotation of the cylindrical housing 28 and the vibratory assembly relative to the upstanding members 12 and 14.

A drive motor 46 is coupled via a chain 48 to a sprocket wheel affixed to the vibratory assembly or to the cylindrical housing 28. The motor 46 and chain 48 cause the vibratory assembly and the workpiece contacting surface 52 of the horn 20 to rotate while welding a workpiece.

To provide a seam weld a workpiece is placed on anvil wheel 50 which is coupled to a piston of a hydraulically actuated cylinder 51. The workpiece is urged into forced contact with the workpiece engaging surface 52 of the horn 20. The workpiece engaging surface 52 is disposed at an antinodal region of vibratory motion and thus undergoes in the case of 20 kHz operation reciprocating motion of approximately 0.002 to 0.006 inches (50 to 150 microns) peak-to-peak amplitude in the direction of arrow 54 when the electrical energy signal from generator 26 is provided to the converter 16 via cable 22 and brushes 24. Concomitantly, the motor 46 is actuated for causing the vibratory assembly to rotate about its longitudinal axis, hence causing the workpiece W to be driven through the welding station while undergoing a welding process. In order to assure a more uniform feeding of the workpiece, the anvil wheel 50 may be driven also by coupling it to the motor 46.

Figure 4:
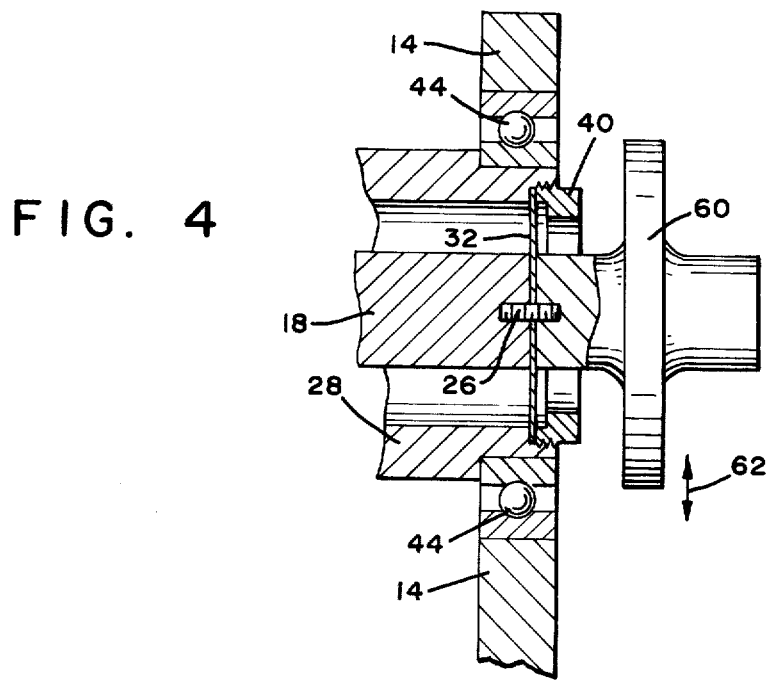
FIG. 4 is a partial sectional view of a further embodiment of a resonator used in the present apparatus.

While in FIGS. 1 and 2 a horn having a centrally disposed bore 53 is shown, FIGS. 3 and 4 illustrate alternative horn constructions for use with the present welding apparatus. In FIG. 3, a disc 58 forming the output end of the horn and resonating in the flexural mode, undergoing vibratory motion parallel to the workpiece surface in the direction of arrow 59, is shown. In FIG. 4, a radial mode resonating disc contacting the workpiece at a nodal region of the horn is shown. The workpiece engaging surface of the horn undergoes vibratory motion normal to the workpiece surface in the direction of arrow 62.

While there has been described and illustrated a preferred embodiment of the invention, it will be apparent to those skilled in the art that modifications may be made without departing from the broad principle and spirit of this invention which shall be limited only by the scope of the appended claims.

What is claimed is:

1. A vibratory seam welding apparatus comprising:
 a cylindrical housing;
 a stationary support;
 bearing means supporting said housing for rotation in said support;
 an electroacoustic converter for providing mechanical vibrations responsive to applied electrical energy of predetermined frequency;
 a resonator coupled to said converter and being rendered resonant as a half wavelength resonator responsive to the vibrations from said converter whereby said converter and resonator in combination are resonant along their longitudinal axis;
 a pair of metallic diaphragms secured to said housing and coupled to said converter and resonator combination at respective antinodal regions of longitudinal motion for disposing said converter and horn substantially concentrically relative to said housing;
 drive means coupled for rotating said resonator relative to said support, and anvil means disposed opposite said resonator for supporting a workpiece and urging it into contact with a radially disposed workpiece engaging surface of said resonator to provide a seam weld responsive to said resonator being resonant and rotating.

2. A vibratory seam welding apparatus as set forth in claim 1, said anvil means comprising a wheel.

3. A vibratory seam welding apparatus as set forth in claim 2, including means for rotating said anvil relative to said support.

4. A vibratory seam welding apparatus as set forth in claim 1, said workpiece engaging surface being disposed at an antinodal region of a disk resonating in the flexural mode.

5. A vibratory seam welding apparatus as set forth in claim 1, said workpiece engaging surface being disposed at a nodal region of a disk resonating in the radial mode.

6. A vibratory seam welding apparatus comprising:
a cylindrical housing;
a stationary support;
bearing means supporting said housing for rotation in said support;
an electroacoustic converter for providing mechanical vibrations responsive to applied electrical energy of predetermined frequency;
a resonator coupled to said converter and being rendered resonant as a half wavelength resonator responsive to the vibrations from said converter whereby said converter and resonator in combination are resonant along their longitudinal axis;
a pair of metallic diaphragms secured to said housing and coupled to said converter and resonator combination at respective antinodal regions of longitudinal motion for disposing said converter and horn substantially concentrically relative to said housing;
drive means coupled for rotating said resonator relative to said support, and
anvil means disposed opposite said resonator at substantially an antinodal zone of its longitudinal motion for supporting a workpiece and urging it into contact with a radial surface of said resonator to provide a seam weld responsive to said resonator being resonant and rotating.

* * * * *

UNITED STATES PATENT AND TRADEMARK OFFICE
CERTIFICATE OF CORRECTION

PATENT NO. : 3,955,740
DATED : May 11, 1976
INVENTOR(S) : ANDREW SHOH

It is certified that error appears in the above-identified patent and that said Letters Patent are hereby corrected as shown below:

Column 4, line 64, cancel "horn" and insert therefor

--resonator--.

Column 6, line 12, cancel "horn" and insert therefor

--resonator--.

Signed and Sealed this

Tenth Day of August 1976

[SEAL]

Attest:

RUTH C. MASON
Attesting Officer

C. MARSHALL DANN
Commissioner of Patents and Trademarks